US007864780B1

(12) United States Patent
Satapati (10) Patent No.: US 7,864,780 B1
(45) Date of Patent: *Jan. 4, 2011

(54) APPARATUS AND METHODS FOR HANDLING NAME RESOLUTION OVER IPV6 USING NAT-PT AND DNS-ALG

(75) Inventor: Suresh Satapati, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1372 days.

This patent is subject to a terminal disclaimer.

(21) Appl. No.: 10/427,206

(22) Filed: Apr. 29, 2003

(51) Int. Cl.
*H04L 12/28* (2006.01)
(52) U.S. Cl. .................. 370/395.54; 370/410; 370/466; 709/225
(58) Field of Classification Search ................. 370/392, 370/466, 401, 252, 389, 236; 455/432
See application file for complete search history.

(56) References Cited

U.S. PATENT DOCUMENTS

| | | | |
|---|---|---|---|
| 4,962,532 A | 10/1990 | Kasiraj et al. | |
| 5,159,592 A | 10/1992 | Perkins | |
| 5,287,103 A | 2/1994 | Kasprzyk et al. | |
| 5,371,852 A | 12/1994 | Attanasio et al. | |
| 5,406,557 A | 4/1995 | Baudoin | |
| 5,426,637 A | 6/1995 | Derby et al. | |
| 5,430,715 A | 7/1995 | Corbalis et al. | |
| 5,477,531 A | 12/1995 | McKee et al. | |
| 5,513,337 A | 4/1996 | Gillespie et al. | |
| 5,550,984 A | 8/1996 | Gelb | |
| 5,560,013 A | 9/1996 | Scalzi et al. | |
| 5,608,738 A | 3/1997 | Matsushita | |
| 5,621,727 A | 4/1997 | Vaudreuil | |
| 5,623,601 A | 4/1997 | Vu | |
| 5,636,216 A | 6/1997 | Fox et al. | |
| 5,790,548 A | 8/1998 | Sistanizadeh | |
| 5,793,763 A | 8/1998 | Mayes et al. | |
| 5,841,437 A * | 11/1998 | Fishkin et al. | ............. 345/619 |
| 5,856,974 A | 1/1999 | Gervais et al. | |
| 5,870,386 A | 2/1999 | Perlman et al. | |

(Continued)

OTHER PUBLICATIONS

Hallin and Sataapati. NAT-PT DNS ALG solutions—01 Network Working Group, Jul. 24, 2002.*

(Continued)

*Primary Examiner*—Donald L Mills
*Assistant Examiner*—Henry Baron
(74) *Attorney, Agent, or Firm*—Weaver Austin Villeneuve & Sampson LLP (57) ABSTRACT

Methods and apparatus for processing a DNS query by a NAT device are disclosed. A NAT device (e.g., NAT-PT device) receives the DNS query from a node. The NAT device then sends two DNS queries to a DNS server. Specifically, each of the DNS queries requests an IP address in a different version of IP (e.g., IPv4 or IPv6). For example, each of the DNS queries may request an A record or an AAAA record. When the NAT device receives two DNS replies from the DNS server, it forwards only one of the DNS replies to the node. Specifically, the DNS reply that is forwarded includes at least one answer record. DNS replies that do not include at least one answer record, or are received subsequent to forwarding the DNS reply to the node, are dropped by the NAT device.

29 Claims, 6 Drawing Sheets

U.S. PATENT DOCUMENTS

| | | | |
|---|---|---|---|
| 6,061,797 A | | 5/2000 | Jade et al. |
| 6,118,784 A | * | 9/2000 | Tsuchiya et al. ............ 370/401 |
| 6,128,664 A | | 10/2000 | Yanagidate et al. |
| 6,154,839 A | | 11/2000 | Arrow et al. |
| 6,188,684 B1 | | 2/2001 | Setoyama |
| 7,085,270 B2 | * | 8/2006 | Inouchi et al. ............... 370/392 |

OTHER PUBLICATIONS

Y. Rekhter, et al. "Address Allocation for Private Internets", RFC: 1597, Network Working Group, Mar. 1994.

Y. Rekhter, et al., "Address Allocation for Private Internets," RFC: 1918, Network Working Group, Feb. 1996, 9 pages.

G. Tsirtsis, et al., "Network Address Translation-Protocol Translation (NAT-PT)," Campio Communications, Feb. 2000, RFC 2766. pp. 1 to 20.

R. Gilligan, et al., "Transition Mechanisms for IPv6 Hosts and Routers", Sun Microsystems, Inc., Apr. 1996, RFC 1933. pp. 1-21.

R. Hinden, et al., "IP Version 6 Addressing Architecture", Cisco Systems, Jul. 1998, RFC 2373. pp. 1-25.

S. Deering, et al., "Internet Protocol, Version 6 (IPv6) Specification", Nokia, Dec. 1998. RFC 2460. pp. 1-37.

T. Narten, et al., "Neighbor Discovery for IP Version 6 (IPv6)", Daydreamer, Dec. 1998. RFC 2461. pp. 1-87.

A. Conta, et al., "Internet Control Message Protocol (ICMPv6) for the Internet Protocol Version 6 (IPv6) Specification", Cisco Systems, Dec. 1998. RFC 2463. pp. 1-17.

P. Srisuresh, et al., "IP Network Address Translator (NAT) Terminology and Considerations", Lucent Technologies, Aug. 1999. RFC 2663. pp. 1-29.

P. Srisuresh, et al., DNS Extensions to Network Address Translator (DNS_ALG), Juniper Networks, Sep. 1999. RFC 2694. pp. 1-28.

E. Nordmark, et al., "Stateless IP/ICMP Translation Algorithm (SIIT)", Sun Microsystems, Feb. 2000. RFC 2765. pp. 1-25.

K. Egevang, et al., "The IP Network Address Translator (NAT)", NTT, May 1994. RFC 1631. pp. 1-10.

P. Hallin, et al., "NAT-PT DNS ALG Solutions", Jul. 24, 2002, draft-hallin-natpt-dns-alg-solutions-01, Internet-Draft, pp. 1-11.

R. Samprathi, et al, U.S. Appl. No. 10/411,698, filed Apr. 11, 2003.

M. Somasundaram, et al, U.S. Appl. No. 10/026,272, filed Dec. 21, 2001.

* cited by examiner

APPARATUS AND METHODS FOR HANDLING NAME RESOLUTION OVER IPV6 USING NAT-PT AND DNS-ALG

BACKGROUND OF THE INVENTION

The present invention relates to methods and apparatus for processing data within a computer network. More specifically, this invention relates to mechanisms for performing a name-to-address resolution using DNS-ALG and NAT-PT.

For a particular computer to communicate with other computers or web servers within a network (e.g., the Internet), the particular computer must have a unique IP address. IP protocol version 4 specifies 32 bits for the IP address, which theoretically gives about 4,294,967,296 unique IP addresses. However, there are actually only between 3.2 and 3.3 billion available IP addresses since the addresses are separated into classes and set aside for multicasting, testing and other special uses. With the explosion of the Internet, the number of IP addresses is not enough to give each computer a unique IP address.

One solution for addressing computers with the limited number of IP addresses is referred to as network address translation (NAT). NAT allows an intermediary device (e.g., computer, router or switch) located between the Internet network and a local network to serve as an agent for a group of local computers. A small range of IP addresses or a single IP address is assigned to represent the group of local computers. Each computer within the local group is also given a local IP address that is only used within that local group. However, the group's local IP addresses may be a duplicate of an IP address that is used within another local network. When a local computer attempts to communicate with a computer outside the local network, the intermediary device matches the local computer's local IP address to one of the intermediary device's assigned IP addresses. The intermediary device than replaces the local computer's local address with the matched assigned IP address. This matched assigned IP address is then used to communicate between the local computer and the outside computer. Thus, NAT techniques allow an IP address to be duplicated across local networks.

In addition to IP addresses, a packet may also contain address(es) embedded in the payload that require translation. Particular applications may embed address(es) in the payload for various application specific purposes. The current approach for supporting applications which embed IP addresses in the payload (e.g., DNS (domain name server), FTP (file transfer protocol), H.225/H.245) in a NAT environment is to add application-specific knowledge within the NAT device itself. This approach is described in detail in the Internet Engineering Task Force's Request for Comments document RFC 2663, entitled IP "Network Address Translator (NAT) Terminology and Considerations" by P. Srisuresh and M. Holdrege of Lucent Technologies (August 1999), which document is incorporated herein by reference in its entirety.

Name to address mappings are maintained by each DNS server. For instance, IP version 4 name to address mappings are held in "A" records, while IP version 6 name to address mappings are held in "AAAA" records. A particular domain name may have an IP version 4 address and/or an IP version 6 address mapping. An IP version 4 address is composed of 32 bits, while an IP version 6 address is composed of 128 bits.

RFC 2766, "Network Address Translation-Protocol Translation (NAT-PT)," by Tsirtsis, G. and Srisuresh, P., February 2000, which is incorporated by reference in its entirety, discloses a NAT-PT mechanism that is capable of protocol translation as well as network address translation. In other words, the NAT-PT device is capable of translating addresses between IPv4 and IPv6, as well as translating an IP protocol header from IP version 4 to IP version 6 and vice-versa. For example, when an IPv6 node "A" wants to set up a session with an IPv4 Node "C," node A starts by requesting a name look-up by requesting a "AAAA" record for Node C. When the "AAAA" record DNS query is received by the NAT-PT device, the NAT-PT/DNS-ALG device generates two separate DNS queries. The first DNS query is an "AAAA" record DNS query and the second DNS query is an "A" record DNS query. In response, the DNS server replies to each DNS query. If an AAAA record exists for the destination, this will be returned to the NAT-PT device which will forward it to the originating host, A. If there is an A record, this will be returned to the NAT-PT device, which will then add the appropriate prefix to the IP version 4 address to convert that address to an IP version 6 address having 128 bits.

As described above, the NAT-PT device may return an IPv6 address, regardless of whether that IP address is obtained from an AAAA record or an A record. However, it is important to note that the NAT-PT device sends two DNS requests in accordance with RFC 2766 in various circumstances. As a result, the NAT-PT device will receive two different DNS replies. Moreover, the NAT-PT device may receive these two DNS replies in any order. Unfortunately, RFC 2766 does not provide for the situation in which the DNS server (in the IPv4 domain) sends two DNS replies for a single DNS query (i.e., AAAA query) initiated by a node.

In view of the above, there is a need for improved DNS-ALG mechanisms for processing DNS replies.

SUMMARY OF THE INVENTION

Methods and apparatus for processing a DNS query by a NAT-PT device implementing DNS-ALG are disclosed. According to RFC 2766, when the NAT-PT device receives a DNS query of type AAAA, it sends multiple DNS queries to a DNS server corresponding to multiple versions of the IP protocol, i.e. 'A' and 'AAAA' type. In response, the NAT-PT device may receive multiple DNS replies. The present invention enables a NAT-PT device implementing DNS-ALG to forward a single one of the DNS replies to the node initiating the DNS query.

In accordance with one aspect of the invention, when a NAT-PT device receives a 'AAAA' DNS query from a node, The device then sends two DNS queries to the DNS server. Specifically, each of the DNS queries requests an IP address in a different version of IP (e.g., IPv4 or IPv6). For example, each of the DNS queries may request an A record or an AAAA record. When the device receives two or more DNS replies from the DNS server, it forwards only one of the DNS replies to the node. Specifically, the DNS reply that is forwarded includes at least one answer record. DNS replies that do not include at least one answer record, or are received subsequent to forwarding a DNS reply to the node, are dropped by the device.

In accordance with another aspect of the invention, when the device receives a DNS reply, it determines whether the DNS reply includes at least one answer resource record. If the DNS reply includes at least one answer record, it is returned to the node (after translation is performed if required) as appropriate. If the DNS reply does not include at least one answer record, the DNS reply is dropped. If multiple DNS replies received by the NAT device include at least one answer record, only one of the DNS replies is forwarded to the node. For instance, the first DNS reply may be forwarded to the node. As a result, once a DNS reply is forwarded to the node, a subsequent DNS reply received by the node is dropped, regardless of whether the DNS reply includes an answer record.

In accordance with yet another aspect of the invention, the NAT device performs network address translation (NAT). In general terms, mechanisms (e.g., within a combination router/NAT device) are provided for translating network addresses of traffic going between two private domains or realms. These mechanisms may also be used to translate traffic going between a private and public domain.

In accordance with yet another aspect of the invention, the NAT device performs protocol translation (PT). Specifically, protocol translation is performed on the IP header as well as the payload of the DNS reply. For instance, addresses may be translated from one version of IP (e.g., IPv4) to another version of IP (e.g., IPv6). In addition, the record type provided in the payload of the DNS reply may be modified. For instance, the record type may be modified from A to AAAA, or vice versa.

In accordance with another aspect of the invention, the invention pertains to a network address translation (NAT) system operable to perform network address translation and protocol translation (PT). The NAT system includes one or more processors and one or more memories. At least one of the memories and processors are adapted to provide at least some of the above described method operations. In yet a further embodiment, the invention pertains to a computer program product for performing network address translation on data. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

When two different DNS replies are received for a AAAA query by a NAT-PT device from a DNS server in the Ipv4 network, various scenarios may occur. In the first scenario, the DNS server (in the IPv4 network) has an AAAA record only. As a result, the DNS server has sent out a DNS reply with a AAAA record, and another DNS reply in response to the A record query which does not include an answer resource record. The reply for the AAAA query including the answer resource record is received first, while the reply for the A query with no answer resource record is received second. In the second scenario, the replies are returned in the reverse order, and therefore the reply for the A query with no answer resource record is received first, while the reply for the AAAA query including the answer resource record is received second.

In the third scenario, the DNS server has an A record only. As a result, the DNS server has sent out a DNS reply with an A record, and another DNS reply in response to the AAAA query which does not include an answer resource record. The reply for the AAAA query that does not include an answer resource record is received first, while the reply for the A query that includes the A record is received second. In the fourth scenario, the replies are received in the reverse order, and therefore the reply for the A query including the answer resource record is received first, while the reply for the AAAA query that does not include an answer resource record is received second.

In a fifth scenario, the DNS server has both an A record and an AAAA record. The DNS response including the AAAA record is returned first, while the DNS response including the A record is returned second. In the sixth scenario, the DNS response including the A record is returned first, while the DNS response including the AAAA record is returned second.

In the second scenario and the third scenario, the first DNS response to be received by the node does not include an answer section (i.e., answer resource record). A single DNS reply is expected by a node initiating a DNS query. Any further replies will be discarded. Because the first DNS reply received by the node does not include an answer section (e.g., IPv6 address), this means that the name resolution query initiated by the node has failed. Thus, although there is a second DNS reply that contains one or more answer section(s) (e.g., IPv6 address), the node will not be able to establish a session since this second reply is discarded by its DNS client resolver. Accordingly, the node cannot establish the desired session.

In the following description, various embodiments of the invention propose a solution to enable a node to establish a session where the first DNS response received by the NAT-PT device does not include one or more answer sections. In addition, various embodiments of the invention enable a session to be established where both DNS replies each include one or more answer sections.

Throughout this document, we assume that the DNS-ALG functionality is implemented in the same device that is implementing NAT-PT. However, this invention is not restricted to this setting in any manner, and it covers the other scenario where DNS-ALG need not be hosted by the same device that is hosting NAT-PT functionality, which will be appreciated by those skilled in the art.

Figure 1:
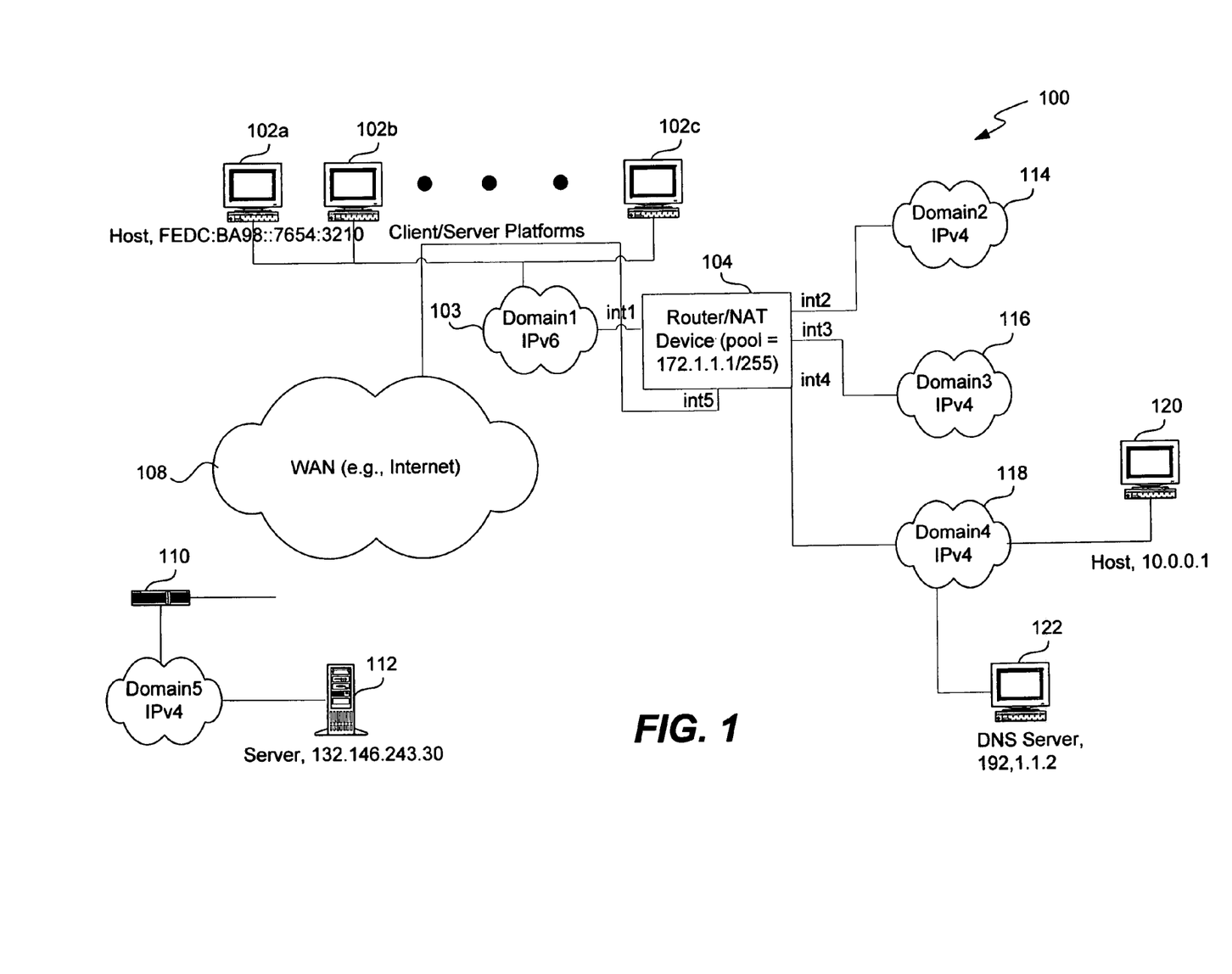
FIG. 1 is a diagrammatic illustration of portions of a network in which the techniques of the present invention may be implemented in accordance with one embodiment of the present invention.

FIG. 1 is a diagrammatic illustration of portions of a network 100 in which the techniques of the present invention may be implemented in accordance with one embodiment of the present invention. In general terms, the present invention provides mechanisms for performing network address translation (NAT) and protocol translation (PT) between a plurality of different IP version domains in accordance with RFC 2766. In the illustrated embodiment, these NAT techniques are implemented within a combination router and NAT device 104 (e.g., NAT-PT device). The NAT device 104 supports NAT and PT in accordance with RFC 2766. Of course the NAT techniques of the present invention may be implemented in any suitable number and type of devices.

In the illustrated example, the NAT device 104 has five interfaces INT1 through INT5. Four of the interfaces INT1 through INT4 are each coupled to a private domain. For example, interface INT1 is coupled to private Domain1 103 and interface INT4 is coupled with private Domain4. Each domain may include any suitable number of local and private networks. As shown, Domain1 includes a private local area network (LAN) 102 of host computers (e.g., 102a, 102b, and 102c). Domain4 118 includes Host 120 and DNS Server 122. Domain4 118 may include other server or client platforms (not shown). The NAT device 104 is also coupled to a public Domain5 (e.g., a wide area network such as the Internet) 108 through interface INT5. Domain5 108 includes server 112, which may be accessed through router 110. Any number of routers and/or NAT devices may be distributed throughout network 100. For example, each domain may be associated with its own router/NAT device.

Within each domain, various nodes (i.e., hosts) may have an IPv6 address or an IPv4 address. Specifically, different versions of the IP protocol may be implemented within various domains. For instance, the first domain may implement IPv6 while the second, third and fourth domains may implement IPv4. In order to communicate with other nodes having IP addresses of different versions, a NAT device such as illustrated in FIG. 1 receives two different DNS replies from a DNS server in response to two different DNS queries sent to the DNS server. The NAT device then selects one of the two DNS replies to forward to the node, after performing network address translation between public and private addresses and/or protocol translation (e.g., between IPv4 and IPv6 addresses) as appropriate in accordance with RFC 2766.

In order to initiate a session, the destination IP address must be obtained. Specifically, a DNS query is sent between Host 102a of Domain1 implementing IPv6 and Server 112 of Domain5 implementing IPv4. In this example, the Host 102a has an IPv6 address FEDC:BA98::7654:3210 and the server 112 has an IPv4 address 132.146.243.30.

Figure 2:
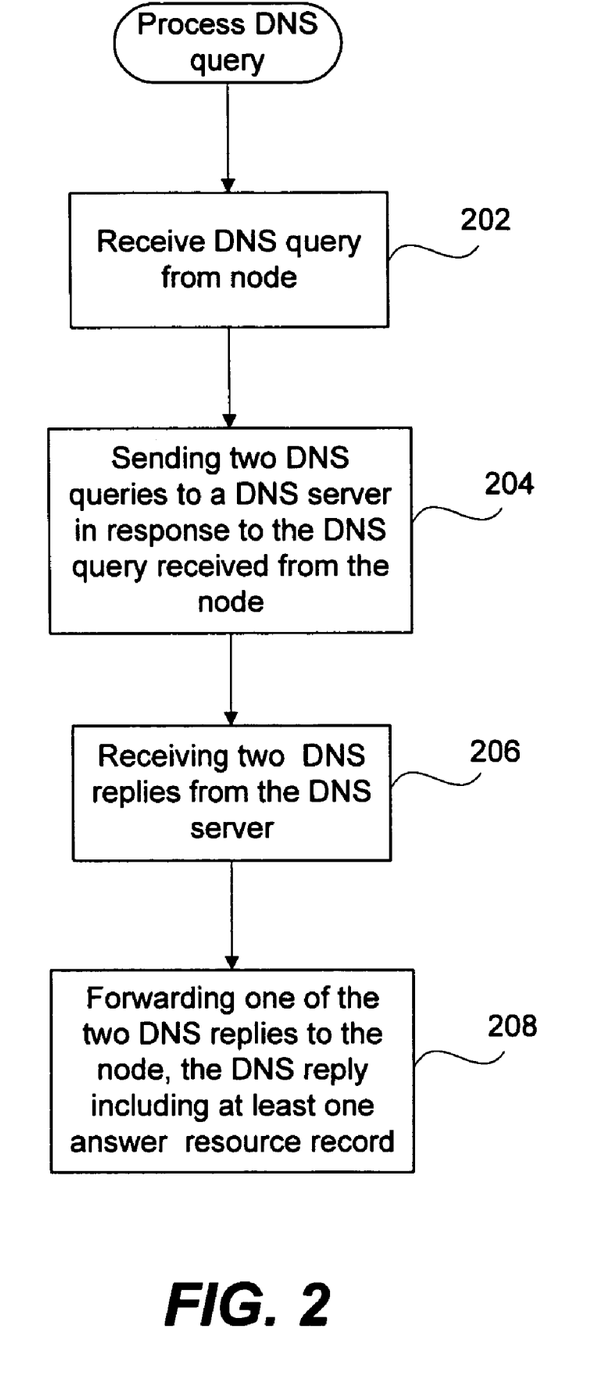
FIG. 2 is a process flow diagram illustrating a method of processing a DNS request in a NAT-PT device in accordance with various embodiments of the invention.

FIG. 2 is a process flow diagram illustrating a method of processing a DNS request in a NAT-PT device in accordance with various embodiments of the invention. The NAT device receives a DNS query from the node (i.e., Host 102a) at block 202. The NAT device then sends two DNS queries to a DNS server at block 204. One method of sending two DNS queries will be described in further detail below with reference to FIG. 3. In response, the NAT device receives one or more DNS replies from the DNS server at block 206. The NAT device then forwards one of the plurality of DNS replies to the node at block 208. One method of forwarding a single DNS reply will be described in further detail below with reference to FIG. 4.

Figure 3:
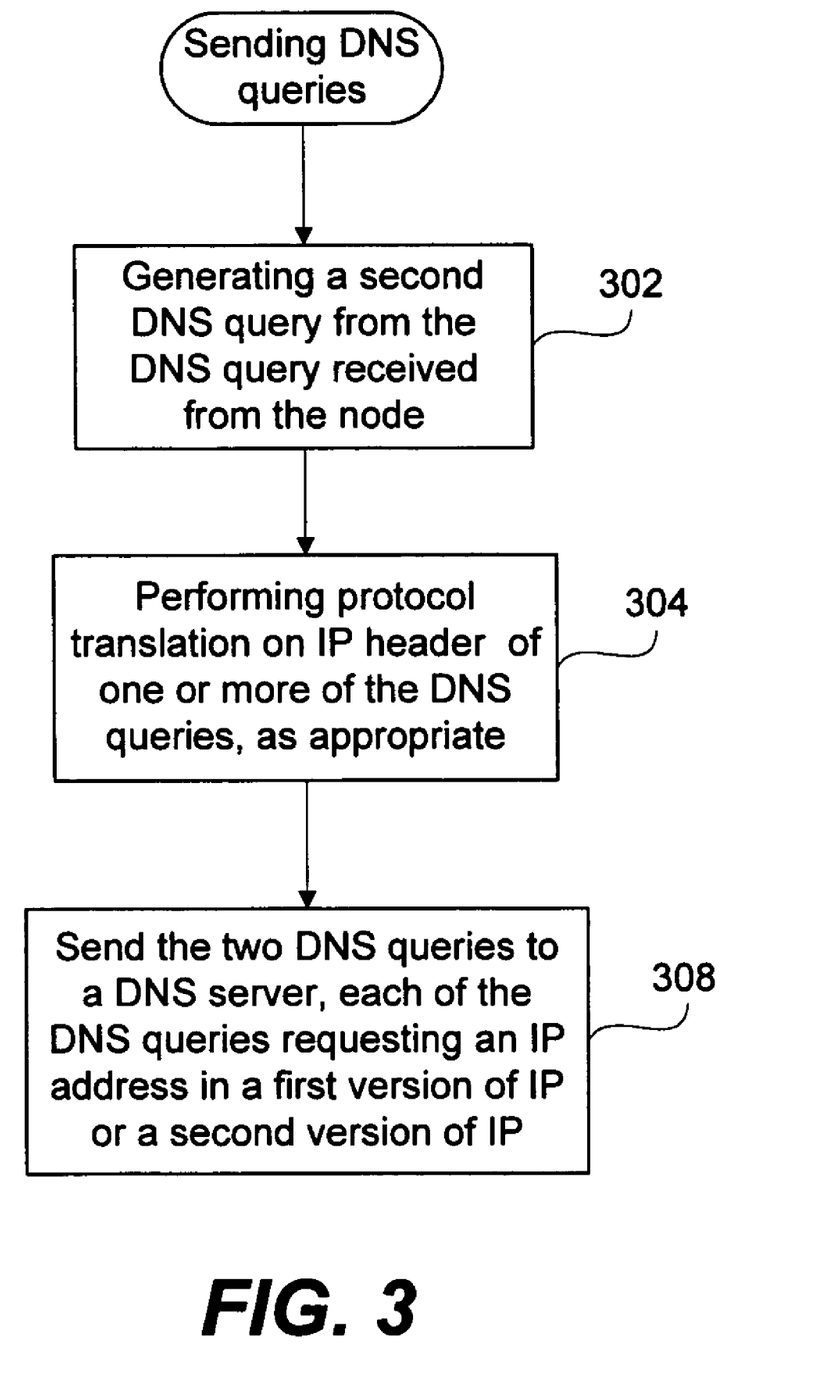
FIG. 3 is a process flow diagram illustrating a method of sending DNS queries to a DNS server in response to a DNS query received by the NAT-PT device as shown at block 204 of FIG. 2.

FIG. 3 is a process flow diagram illustrating a method of sending DNS queries to a DNS server in response to a DNS query received by the NAT-PT device as shown at block 204 of FIG. 2. Since the DNS server may have a DNS record stored for multiple IP protocols (e.g., IPv4 and IPv6), multiple DNS queries are sent to request the IP address in various versions of the IP protocol for the name indicated in the corresponding DNS request. Thus, in accordance with RFC 2766, the NAT device sends two DNS queries. In order to send the DNS queries, the NAT devices generates a second DNS query from the DNS query received from the node at block 302. Each of the two DNS queries requests an IP address in a first version of IP (e.g., IPv4) or a second version of IP (e.g., IPv6). For instance, each of the two DNS queries may request an "A" record or an "AAAA" record. At block 304, the NAT device performs protocol translation on the IP header (e.g., destination IP address and/or source IP address) of one or more of the DNS queries, as appropriate. The NAT device may also perform NAT translation on the IP header (e.g., destination IP address and/or source IP address) of one or more of the DNS queries, as appropriate. The NAT device then sends the two DNS queries to a DNS server at block 308.

Figure 4:
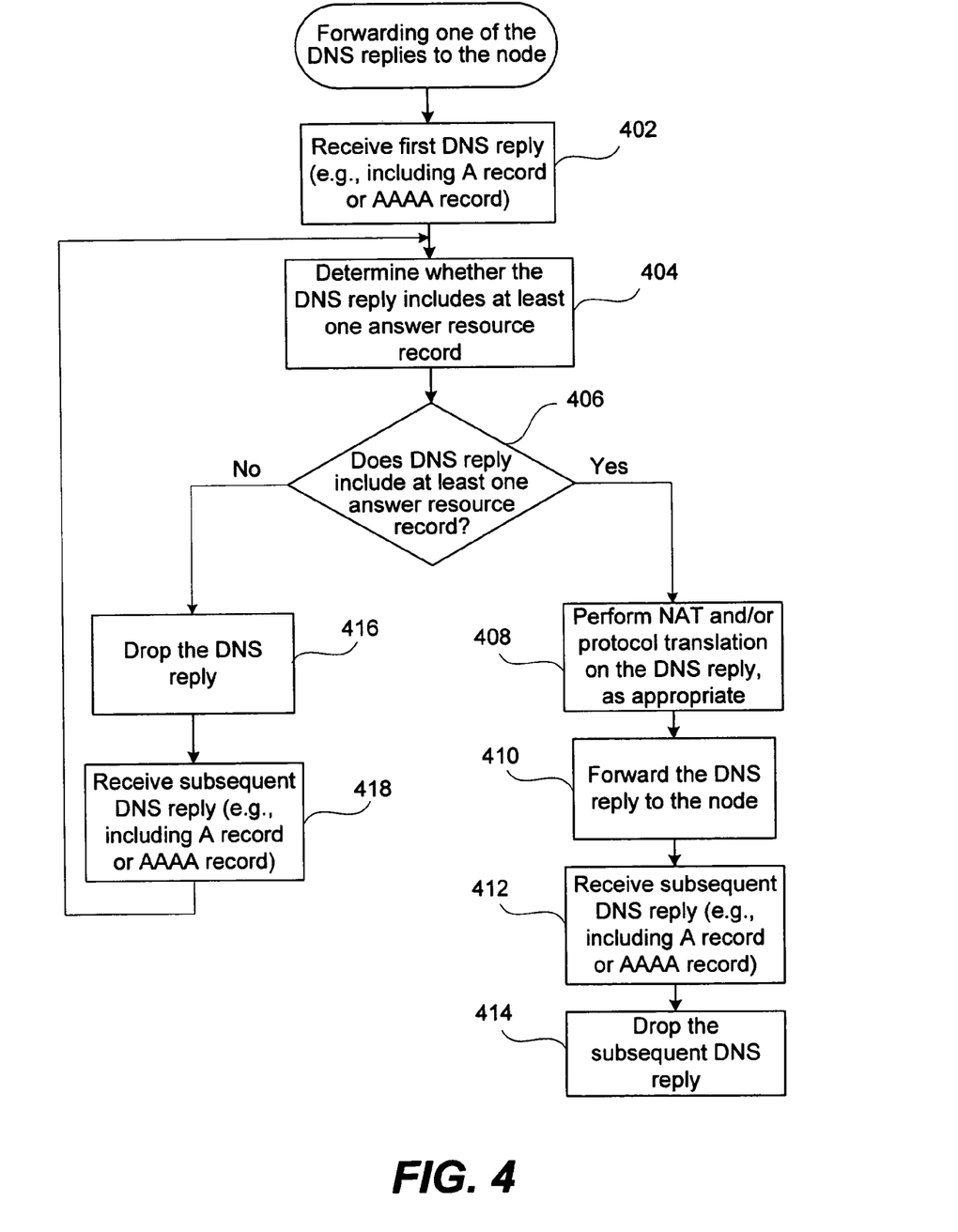
FIG. 4 is a process flow diagram illustrating a method of forwarding a single DNS reply as shown at block 208 of FIG. 2.

FIG. 4 is a process flow diagram illustrating a method of forwarding a single DNS reply as shown at block 208 of FIG. 2. The DNS reply that is forwarded to the node initiating the DNS request must include at least one answer record. Moreover, at least one of the DNS replies will include at least one answer record. Thus, the NAT device selects one of the DNS replies to forward to the node based upon whether the DNS replies include at least one answer record. The NAT device receives the first DNS reply (e.g., including A record or AAAA record) at block 402. The NAT device then determines whether the DNS reply includes at least one answer resource record at block 404. If the NAT device determines that the DNS reply does include at least one answer resource record at block 406, the NAT device performs NAT and/or protocol translation on the DNS reply, as appropriate, at block 408 and forwards the DNS reply to the node at block 410. One method of performing translation will be described in further detail below with reference to FIG. 5.

Once a DNS reply is forwarded to the node, a subsequent DNS reply (e.g., including A record or AAAA record) received at block 412 is dropped by the device responsible for performing DNS-ALG at block 414. Specifically, this reply will be discarded by end DNS resolvers, since a reply already arrived for the outstanding DNS query. Thus, if two DNS replies are received that include at least one answer record, only one of the DNS replies will be forwarded to the requesting node. Specifically, in accordance with one embodiment, the reply that arrives first at the end resolver of the device performing DNS-ALG will be accepted, while subsequent replies are dropped prior to forwarding one of the replies to the requesting node. In accordance with one embodiment, the first of the DNS replies is forwarded, while the subsequent DNS replies are dropped. If the NAT device determines that the DNS reply does not include at least one answer record at block 406, the DNS reply is dropped at block 416 and a DNS reply (e.g., including an A record or AAAA record) that is subsequently received at block 418 is processed as described above.

Figure 5:
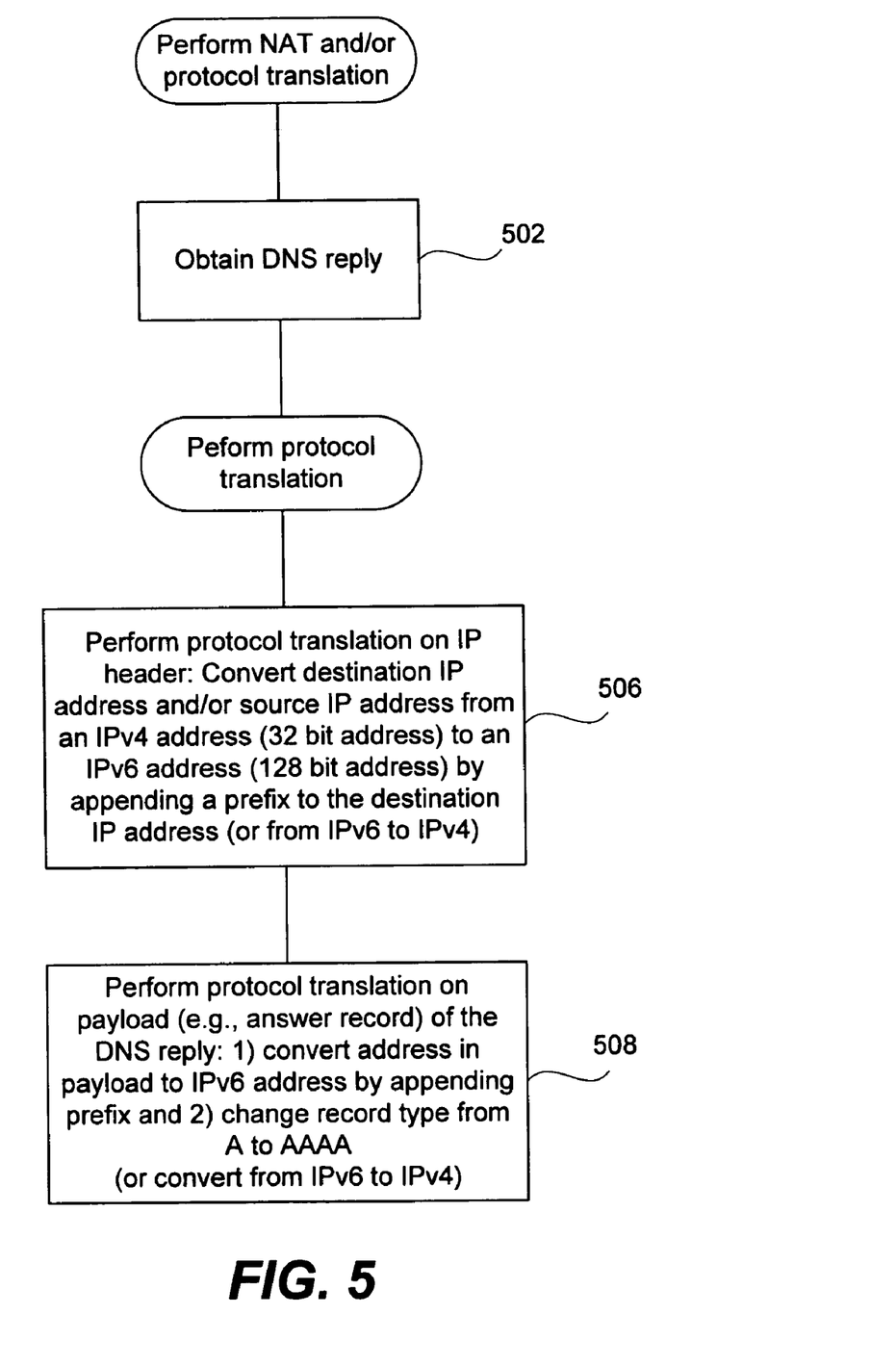
FIG. 5 is a process flow diagram illustrating a method of performing NAT and/or protocol translation as shown at block 408 of FIG. 4.

FIG. 5 is a process flow diagram illustrating a method of performing NAT and/or protocol translation as shown at block 408 of FIG. 4. When the NAT device obtains the DNS reply at block 502, NAT translation is performed on the IP header (e.g., destination IP address and/or source IP address) from private to public address or from public to private address, as appropriate. Next, the NAT device performs protocol translation on the IP header at block 506 (e.g., destination IP address and/or source IP address). Specifically, the NAT device converts the destination IP address (and/or source IP address) from an IPv4 address (32 bit address) to an IPv6 address (128 bit address) by appending a prefix to the destination IP address. In addition, the NAT device performs protocol translation on the payload (e.g., answer record) of the DNS reply at block 508. Specifically, the IP address in the payload of the DNS reply is converted from IPv4 to IPv6 by appending a prefix to the IP address. In addition, the record type in the payload of the DNS reply is changed from A to AAAA.

Upon completion of the process described above, the node (i.e., Host 102a) can now send data to Host 120 since it now knows the public address for Host 120. The IP header for this data includes source address FEDC:BA98::7654:3210 for Host 102a and destination address 132.146.243.30 for Host 120.

While the example above illustrates the generation of queries requesting an A record and an AAAA record, alternative queries may be composed for subsequent or alternative IP versions. Moreover, additional queries may be composed for different IP versions, and therefore more than two DNS queries may be sent by the NAT-PT device.

Generally, the techniques for performing network address translation may be implemented on software and/or hardware. For example, they can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example.

Specific examples of such network devices include routers and switches. For example, the packet processing systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the packet processing system (e.g., NAT device) may be implemented on a general-purpose network host machine such as a personal computer or workstation. Further, the invention may be at least partially implemented on a card (e.g., an interface card) for a network device or a general-purpose computing device.

Figure 6:
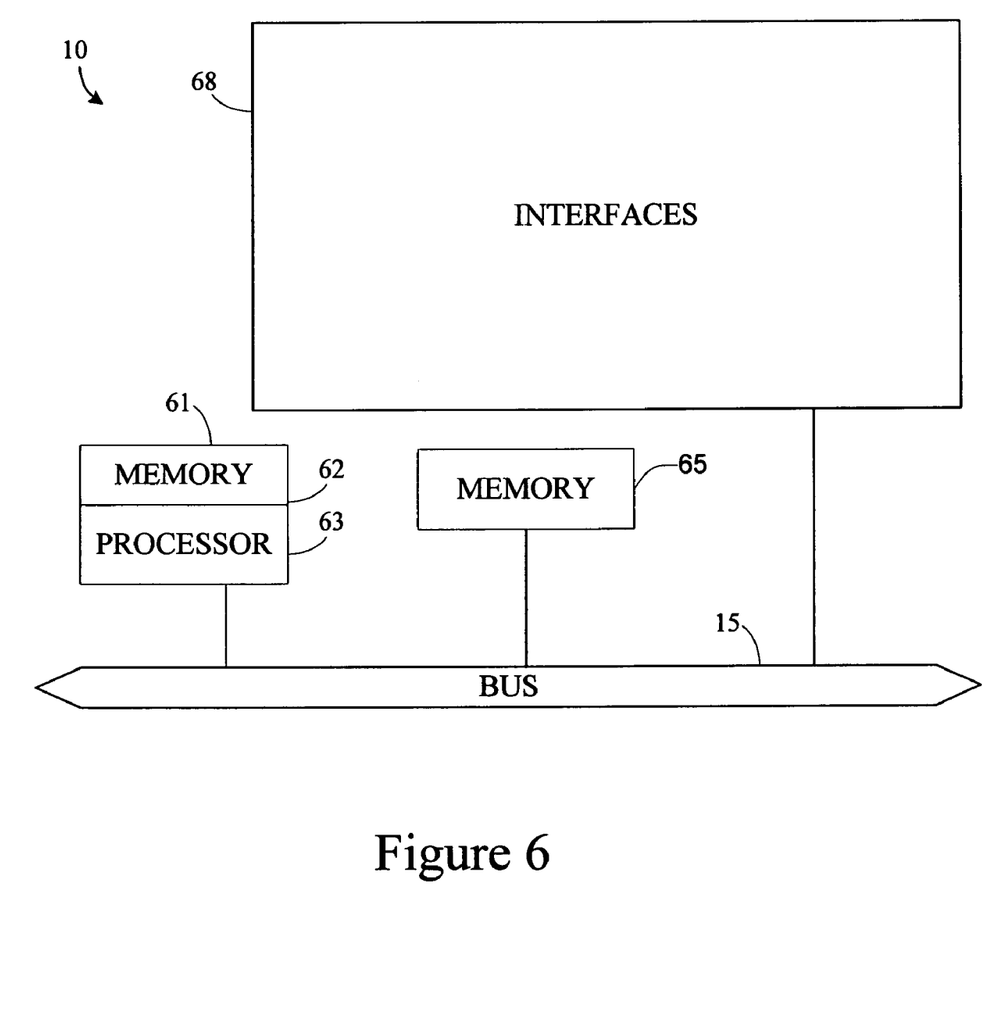
FIG. 6 is a diagrammatic representation of a router in which embodiments of the present invention may be implemented.

Referring now to FIG. 6, a router 10 suitable for implementing embodiments of the present invention includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for determining whether an address is a private address, determining whether a binding is present for a private address, and translating a private address or a DNS payload address into a public pool address, etc. It preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 6 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications, for example. The memory or memories may also be configured to store, track and identify DNS replies received that correspond to each DNS query sent by the NAT device.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. For instance, although the embodiment described performs translation operations converting IP addresses from IPv4 to IPv6, the reverse operations may be performed to translate IP addresses from IPv6 to IPv4. Moreover, although the example described refers to IPv4 and IPv6, the present invention may be used with IP addresses that conform to other versions of IP. Therefore, the described embodiments should be taken as illustrative and not restrictive, and the invention should not be limited to the details given herein but should be defined by the following claims and their full scope of equivalents.

What is claimed is:

1. A method, comprising:
   receiving by a device adapted for performing Network Address Translation and Protocol Translation a single DNS query from a node, the single DNS query requesting an IP address for a name;
   automatically sending by the device two DNS queries to a DNS server in response to the single DNS query received from the node, the two DNS queries including a first DNS query that includes the name and a second DNS query that includes the name, the two DNS queries conforming to two different IP protocols, wherein the node is in a domain conforming to a first one of the two different IP protocols and the DNS server is in a domain conforming to a second one of the two different IP protocols;
   receiving by the device a first DNS reply from the DNS server;
   receiving by the device a second DNS reply from the DNS server, the second DNS reply being received subsequent to the first DNS reply; and
   when the first DNS reply includes at least one answer resource record, automatically forwarding the first DNS reply to the node and dropping the second DNS reply, wherein forwarding the first DNS reply is performed without waiting for the second DNS reply to be received;
   wherein sending the second DNS query is performed automatically without waiting for a DNS reply corresponding to the first DNS query to be received.

2. The method as recited in claim 1, wherein the DNS server is in an IPv4 domain and the node is in an IPv6 domain.

3. The method as recited in claim 1, further comprising:
   performing protocol translation on an IP header of the first DNS reply prior to forwarding the first DNS reply to the node.

4. The method as recited in claim 1, further comprising:
   performing network address translation on an IP header of the first DNS reply prior to forwarding the first DNS reply to the node.

5. The method as recited in claim 1, further comprising:
   performing protocol translation on a destination IP address of the first DNS reply prior to forwarding the first DNS reply to the node.

6. The method as recited in claim 5, wherein performing protocol translation comprises:
   converting the destination and source IP address from an IPv4 address to an IPv6 address.

7. The method as recited in claim 5, wherein performing protocol translation comprises:
   converting the destination and source IP address from a 32 bit address to a 128 bit address.

8. The method as recited in claim 5, wherein performing protocol translation comprises:
   converting the destination and source IP address from an IPv6 address to an IPv4 address.

9. The method as recited in claim 5, wherein performing protocol translation comprises:
   converting the destination and source IP address from a 128 bit address to a 32 bit address.

10. The method as recited in claim 5, further comprising:
    performing network address translation on the destination IP address prior to forwarding the first DNS reply to the node.

11. The method as recited in claim 1, further comprising:
    performing protocol translation on an address provided in a payload of the first DNS reply prior to forwarding the first DNS reply to the node.

12. The method as recited in claim 11, further comprising:
    modifying a type provided in a payload of the first DNS reply prior to forwarding the first DNS reply to the node.

13. The method as recited in claim 12, wherein modifying the type comprises changing the type from A to AAAA.

14. The method as recited in claim 12, wherein modifying the type comprises changing the type from AAAA to A.

15. The method as recited in claim 1, further comprising:
    performing protocol translation on a destination IP address provided in an IP header of at least one of the two DNS queries prior to sending the two DNS queries to the DNS server.

16. The method as recited in claim 15, further comprising:
    performing network address translation on the destination IP address provided in the IP header of at least one of the two DNS queries prior to sending the two DNS queries to the DNS server.

17. The method as recited in claim 1, further comprising:
    performing protocol translation on one or more IP addresses provided in an IP header of at least one of the two DNS queries prior to sending the two DNS queries to the DNS server.

18. The method as recited in claim 1, further comprising:
    performing network address translation on one or more IP addresses in an IP header of at least one of the two DNS queries prior to sending the two DNS queries to the DNS server.

19. The method as recited in claim 1, wherein sending two DNS queries comprises:
    generating a second DNS query from the single DNS query received from the node, each of the DNS queries requesting an IPv4 address or an IPv6 address.

20. The method as recited in claim 1, wherein each of the DNS replies is an A record or an AAAA record.

21. A computer-readable storage medium storing thereon computer-readable instructions, comprising:
    instructions for processing a single DNS query after receiving the single DNS query from a node, the single DNS query requesting an IP address for a name;
    instructions for automatically sending two DNS queries to a DNS server in response to the single DNS query received from the node, the two DNS queries including a first DNS query that includes the name and a second DNS query that includes the name, the two DNS queries conforming to two different IP protocols, wherein the node is in a domain conforming to a first one of the two different IP protocols and the DNS server is in a domain conforming to a second one of the two different IP protocols; and
    instructions for automatically forwarding a first DNS reply that has been received from the DNS server to the node when the first DNS reply includes at least one answer resource record;

instructions for dropping a second DNS reply that has been received from the DNS server when the first DNS reply includes at least one answer resource record;

wherein forwarding the first DNS reply is performed independent of the protocol of the first DNS reply;

wherein sending the second DNS query is performed automatically without waiting for a DNS reply corresponding to the first DNS query to be received.

22. A device adapted for performing Network Address Translation and Protocol Translation, comprising:
a processor; and
a memory, at least one of the processor or the memory being adapted for:
receiving a single DNS query from a node, the single DNS query requesting an IP address for a name;
automatically sending two DNS queries to a DNS server in response to the single DNS query received from the node, the two DNS queries including a first DNS query that includes the name and a second DNS query that includes the name, the two DNS queries conforming to two different IP protocols, wherein the node is in a domain conforming to a first one of the two different IP protocols and the DNS server is in a domain conforming to a second one of the two different IP protocols;
receiving a first DNS reply from the DNS server;
receiving a second DNS reply from the DNS server subsequent to the first DNS reply; and
when the first DNS reply includes at least one answer resource record, automatically forwarding the first DNS reply to the node and dropping the second DNS reply, wherein forwarding the first DNS reply is performed independent of the protocol of the first DNS reply;
wherein sending the second DNS query is performed automatically without waiting for a DNS reply corresponding to the first DNS query to be received.

23. The method as recited in claim 1, further comprising:
determining whether the first DNS reply includes at least one answer resource record;
wherein forwarding the first DNS reply is performed when the first DNS reply includes at least one answer resource record;
wherein dropping the second DNS reply is performed without determining whether the second DNS reply includes at least one answer resource record.

24. The method as recited in claim 1, wherein forwarding the first DNS reply is performed independent of the protocol of each of the DNS replies.

25. The device as recited in claim 22, at least one of the processor or the memory being further adapted for:
determining whether the first DNS reply includes at least one answer resource record;
wherein forwarding the first DNS reply is performed when the first DNS reply includes at least one answer resource record;
wherein dropping the second DNS reply is performed without determining whether the second DNS reply includes at least one answer resource record.

26. The method as recited in claim 1, wherein forwarding the first DNS reply is performed prior to receiving the second DNS reply.

27. The method as recited in claim 1, wherein sending two DNS queries comprises:
generating a second DNS query from the DNS query received from the node, the two DNS queries including a request for an IPv4 address and a request for an IPv6 address.

28. The method as recited in claim 1, wherein sending two DNS queries comprises:
generating a second DNS query from the single DNS query received from the node.

29. The method as recited in claim 1, further comprising:
when the first DNS reply does not include at least one answer resource record, forwarding the second DNS reply to the node and dropping the first DNS reply.

* * * * *